(No Model.)

T. KEYWORTH.
INLET VALVE FOR WATER CLOSETS.

No. 439,730. Patented Nov. 4, 1890.

Witnesses
E. W. Benjamin
Charles A. Herbert

Inventor
Thomas Keyworth
per James A. Whitney
Attorney

UNITED STATES PATENT OFFICE.

THOMAS KEYWORTH, OF PHILADELPHIA, PENNSYLVANIA.

INLET-VALVE FOR WATER-CLOSETS.

SPECIFICATION forming part of Letters Patent No. 439,730, dated November 4, 1890.

Application filed September 25, 1886. Serial No. 214,496. (No model.)

*To all whom it may concern:*

Be it known that I, THOMAS KEYWORTH, of the city and county of Philadelphia, in the State of Pennsylvania, have invented certain Improvements in Inlet-Valves for Water-Closets, of which the following is a specification.

My invention relates to float-operated valves for controlling the inlet of water to water-closets, either in close conjunction with the bowl or in connection with the tank, and is more especially intended for use under conditions of high pressure, although it may be advantageously employed with water at any desired pressure.

My improvement comprises a novel construction and combination of the parts whereby the pressure of the inflow upon a non-balanced valve constantly tends to close it, whether it is in open or whether it is in closed position, and thereby prevent the valve being opened by the pressure of the inflow against the closing action of the valve-float and prevent leakage when the valve is closed. These are important advantages, which cannot be obtained by a float-operated valve which opens in the direction of and against the pressure of the inflow, as in Patent No. 291,374, because in such case it often happens that the pressure of the inflow is great enough to open the valve against the resistance of the float. Nor can these advantages be obtained by a float-operated equilibrium or balanced valve, which has a reduced stem, as in said patent.

Figure 1:
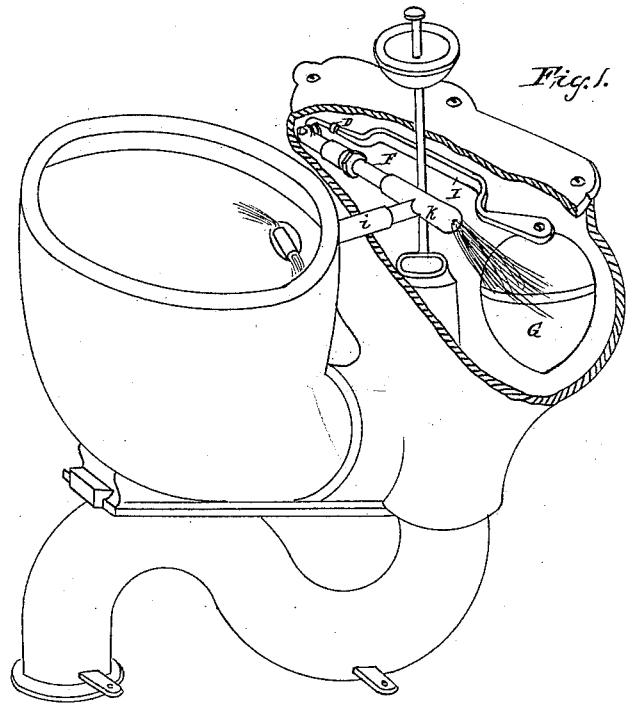
Figure 2:
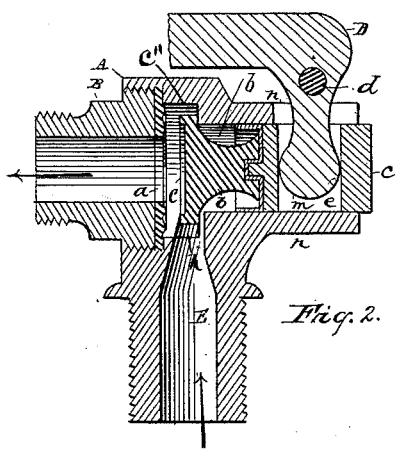
Figure 3:
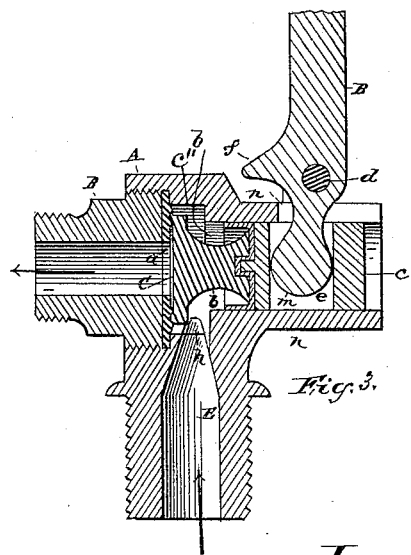

Figure 1 is a perspective view illustrating my said invention as arranged in immediate connection with the bowl of the water-closet. Figs. 2 and 3 are longitudinal sectional views, on a larger scale, showing the construction of the valve itself and the position of its parts when the valve is closed and when opened, respectively.

Referring first to Figs. 2 and 3, A is the shell of the valve, into which is screwed the coupling-nut B, at the inner end of which may be a washer $a$, which forms the valve-seat; but any other construction of valve-seat may be adapted when desired. C is a sliding valve, in which is a circumferential groove or passage $b$. The top of the stem $c$ of this valve C is provided with the slot $e$, in which is placed the heel $m$ of a lever D, pivoted, as shown, at $d$. $h$ is the inlet-port, contiguous to which is a threaded pipe-connection E, whereby the device may be connected with the pipe which leads from the source of water-supply. The coupling-nut B is connected by a suitable coupling with the inlet-pipe of the water-closet, whether the same, as represented in Fig. 1, connects with the flushing-pipe $i$ and with the pipe $k$ to supply water to actuate the float G, or whether the same connects with the inlet-pipe which leads direct from the container to the bowl—in other words, from the outlet of the container.

As represented in Fig. 1, the lever D is connected by a rod or bar I with the float G, so that when the float is lifted in the usual manner it will lift the lever D and move inward the sliding valve C by the action of the heel $m$ of the said lever D against the outer end of the said valve, thereby closing the valve, so that when the float G is depressed, and thereby acts as a weight, it will depress the lever D, and thus cause the heel $m$ of the said lever to move the said valve outward to open the same, the heel $m$ being placed in the slot $e$, as aforesaid, this open position of the valve being indicated in Fig. 2 and the closed position being represented in Fig. 3.

The groove $b$ is so arranged and formed upon the valve-stem as to make the preponderance of pressure on the valve in the direction of its closing movement, and the said groove is also in such relation to the inlet-port $h$ that the said valve-groove will be in perpetual communication with the inlet-port, so as to cause the pressure of the inflow to be in uninterrupted communication with the space formed by the valve-groove and the valve-case, and will act directly upon the largest face of the grooved stem, and thus constantly press against the back of the valve and tend to force the valve always toward its seat and to hold it seated when closed; but to obtain this result the valve cannot be of the equilibrium or balanced type. This construction prevents the valve being opened by the pressure of the inflow against the resistance of the float and prevents the leakage of the valve.

The pressure upon the non-balanced valve to close it is always constant and is in proportion to the pressure of the water in the service-pipe.

It will be understood that in providing for the utilization of the pressure of the inflow of the water from the service-pipe the valve will be limited in its opening movement by the stop $f$ of the float-lever D or by other suitable means, so that the inlet-port $h$ and the valve-stem space $b$ will not at any time be closed by the valve when the latter is open, and when in the latter position the communication between the valve-space and the inlet-port may be just sufficient to give the closing pressure of the inlet-flow within the valve-space $b$, while the water under pressure is passing out in front of the valve and away from its closing action.

I have stated that the face of the valve is of greater diameter than its stem part $n$, which is back of the valve-space $b$, and it will be understood that this provision is important to maintain the preponderance of the pressure on the valve in the direction of its closing movement and to make it a non-balanced valve, for were it not for this unequal area of valve-surface into which the valve-stem space $b$ terminates the pressure of the water within the valve-space $b$ would be balanced, and thus fail to give the advantage stated, as it would neither tend to force the valve open or closed.

The valve-case is recessed at $c''$ at its junction with the valve-seat washer $a$ to accommodate the increased diameter of the valve-face.

The top part of the lever D is arranged to limit the outward movement of the valve when the same is brought outward or open, thereby limiting to the requisite degree the opening of the valve. Furthermore, the face of the valve is of greater diameter than the cylindrical portion $n$, so that a sufficient preponderance of the surface at the front of the groove or passage $b$ is provided to insure the hereinbefore-specified action of water-pressure in closing and holding the valve to its seat.

I claim—

In an inlet-valve for water-closets, the combination of the valve-case, the inlet-connection E, the outlet-coupling B, the valve C, having a greater diameter than its stem part and arranged to open and to close in the direction of the outflow-passage, and having a circumferential groove $b$ between its greatest and least diameters arranged to have perpetual communication with the inflow-passage, and a suitable stop for maintaining such communication in opening the valve, for the purpose stated.

THOMAS KEYWORTH.

Witnesses:
AL. P. BURCHELL,
JOHN J. CAMPBELL.